Oct. 30, 1962  G. R. HOFFMASTER ETAL  3,060,444
HEADGEAR FOR FACE PROTECTIVE ELEMENT
Filed Aug. 16, 1960
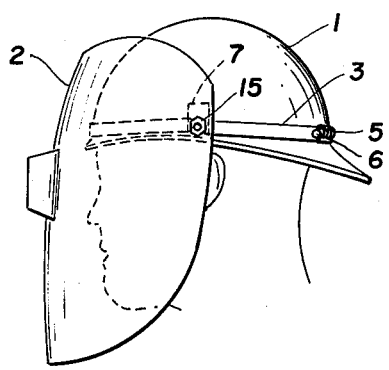
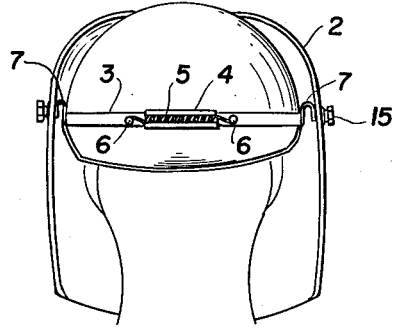
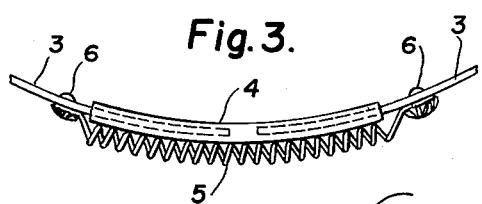
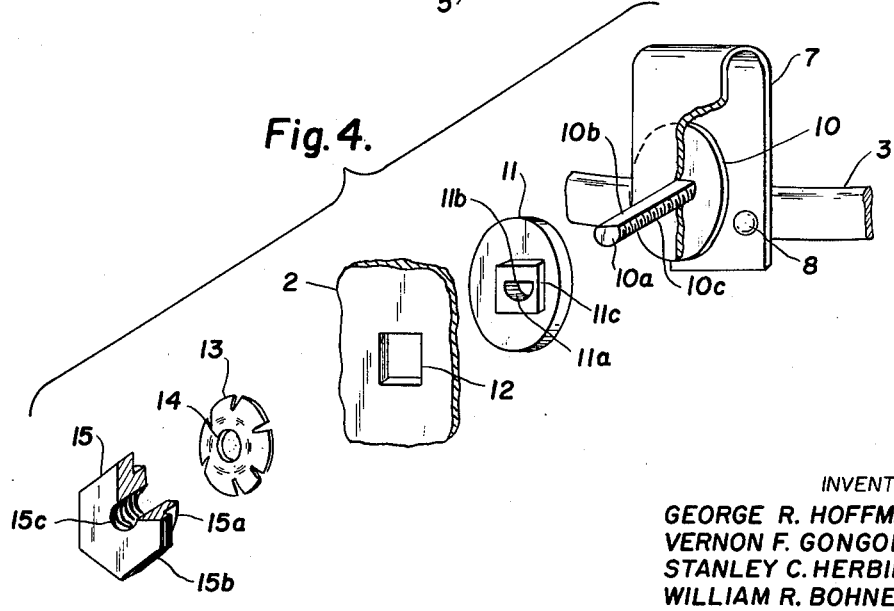
INVENTORS.
GEORGE R. HOFFMASTER
VERNON F. GONGOLL
STANLEY C. HERBINE
WILLIAM R. BOHNER
BY
*William J. Ruano*
their ATTORNEY

United States Patent Office 3,060,444
Patented Oct. 30, 1962

3,060,444
HEADGEAR FOR FACE PROTECTIVE ELEMENT
George R. Hoffmaster, Reading, Vernon F. Gongoll, Shillington, Stanley C. Herbine, Wyomissing, and William R. Bohner, Reading, Pa., assignors to The Electric Storage Battery Company, Philadelphia, Pa.
Filed Aug. 16, 1960, Ser. No. 50,027
1 Claim. (Cl. 2—8)

This invention relates to an adjustable headgear construction for protective equipment, and more particularly, to adjustable pivotal means for holding a protective element such as a face shield or welding helmet, at any desired angular position with respect to the headband.

An outstanding disadvantage of pivotal adjusting means conventionally used, is that such means are usually complicated in construction, including numerous intricate parts which add considerably to the manufacturing cost, and which often times become inoperable due to wear or misalignment of one or more of the parts.

An object of the present invention is to provide adjusting means in a headgear for angularly adjusting protective equipment, which adjusting means comprises relatively simple parts.

A more specific object of the present invention is to provide angular adjusting means for a face protective element which is relatively fool-proof and which permits easy and quick adjustment by simply turning a threaded element by means of the fingers.

A further object of the invention is to provide a novel pivotal means for adjustably suporting a face shield, welding helmet or other face protective element, with respect to the headgear at any selective angular position, over a wide range of arcuate movement, and including adjusting means to enable easy and quick adjustable positioning of the protective piece at any desired angle relative to the face of the wearer, to permit either covering or uncovering of the wearer's face, which adjustment can be made by hand turning of an adjusting element or by a mere shaking of the head of the wearer.

Other objects and advantages of the present invention will become more aparent from a study of the following specification taken with the accompanying drawing wherein:

FIG. 1 is a side elevational view of a headband assembly for quickly attaching a face protective element on a safety hat or cap and including pivotal means embodying the present invention;

FIG. 2 is a rear elevational view of the assembly shown in FIG. 1;

FIG. 3 is a fragmentary, enlarged view of the rear portion of the headband shown in FIGS. 1 and 2; and FIG. 4 is an enlarged, perspective, exploded view showing the various parts forming one of the frictional, pivotal joints illustrated in FIGS. 1 and 2.

Referring more particularly to FIGS. 1 and 2 of the drawing, numeral 1 denotes a safety hat or cap of any well known construction made of any suitable material such as metal or plastic material, and numeral 2 denotes a face protective element, such as a welding helmet or shield, or a face shield, or the like, which face protective element is pivotally supported by frictional means at opposite sides of a headband 3.

The headband 3 is made of a single elongated strip of plastic or any other suitable material, which is bent to oval shape and the ends of which are inserted in a flat, tubular element 4 of similar material or of different material, which completely encloses the end portions of headband 3. A helical spring 5 rests against the rear portion of the tubular element 4 and its ends are riveted or otherwise secured at 6 to spaced portions on headband 3. The tubular element 4 is loosely slidable with respect to the headband 3. This construction provides yieldable expansion of the girth or perimeter of the headband 3 so as to fit onto the corresponding portion of the safety hat 1, that is to say, as the headband is lowered onto the safety hat 1 the girth expands against the action of spring 5 until it snugly fits around the headband portion of the safety hat 1 to provide a quickly detachable, yieldable fit.

Rigidly secured to opposite sides of headband 3 are inverted U-shaped spring elements 7. Each of the spring elements 7 is provided with a pivotal frictional adjusting means of a construction such as shown in FIG. 4.

Referring more particularly, to FIG. 4, it will be seen that the two inverted U-shaped spring or rigid elements 7 are rigidly secured, by rivets 8, to opposite sides of the headband 3. The free leg of each spring or rigid element 7 has a hole extended therethrough, through which hole there projects a shank 10a having a threaded portion 10c and a flattened side 10b. The shank is integral with a head 10. The shank 10c and head are preferably of metal, nylon or other plastic material. A washer-like element 11, also preferably of metal, nylon or other plastic material, is provided with an integral rectangular projection 11c which has a hole extending therethrough defined by an arcuate portion 11a and flat portion 11b which correspond to the cross section of the shank 10a to provide a snug, nonrotatable fit therewith. A face protective welding or face shield 2, only a fragmentary portion of which is shown in FIG. 4, is provided with a rectangular cut-out 12 corresponding to the outline of projection 11c so as to form a snug fit therewith and prevent rotation of the washer-like element 11 with respect to the face protective element 2.

A cupped spring washer 13 is provided, having a central hole 14 and having a plurality of slots extending radially outwardly through portion of the washer. Nut 15, preferably of metal, nylon or other plastic material, has a threaded portion 15c which is adapted to be screw threaded onto the shank 10a. Nut 15 has an annular end portion 15a adapted to push against spring washer 13.

In assembly, the threaded shank portion 10a is extended through the hole in one of the legs of the inverted U-shaped spring 7, as shown in FIG. 4, and the washer-like element is slipped thereon so as to provide a non-rotatable connection between the hole 11a—11b and threaded shank 10a, which shank is also extended through hole 12 of the face protective element as well as hole 14 of the spring washer 13. The end portion of shank 10a is screwed into the threaded portion of nut 15. The rectangular projection 11c snugly fits within the slot 12 to prevent relative rotation between the washer-like element and face protective element 2.

In operation, therefore upon tightening of the screw 15 so as to draw it closer to head 10, spring washer 13 will flex until it forms a tight, frictional fit against the surface of face protective element 2 surrounding the hole 12, thus more tightly clamping spring element 7 between head 10 and washer-like element 11 and thus increasing frictional resistance to pivotal movement of face protective element 2. The amount of friction may be adjusted by selective rotation of the nut 12 in opposite directions.

The adjustment is such so as to maintain the face protective element 2 in any desired angular position to which it may be lifted against friction resistance of the pivots. Perhaps bolts 15 are sufficiently loose so that element 2 may be pivotally moved above the hat 1 to an angular position, merely by a quick nod of the head.

Thus it will be seen that we have provided a variable friction, pivotal means for selectively adjusting the angular position of the face protective shield or helmet in relation to a helmet or safety hat, which pivotal means comprises very few parts, as compared to those in conventional devices, and which parts are of relatively simple construction, involving minimum mold cost, and which may be made and assembled very cheaply, and yet which assembly is far more effective to hold the face-protective element in any desired angular position.

While we have illustrated and described a single specific embodiment of our invention, it will be understood that this is by way of illustration only, and that various changes and modifications may be made within the contemplation of our invention and within the scope of the following claim.

We claim:

An assembly comprising a face protective element, a headband, a pair of pivotal means on opposite sides of said headband for pivotally mounting said face-protective element, each of said pivotal means comprising an inverted U-shaped spring element, one leg of which is rigidly attached to said headband and the other leg of which has a hole, a bolt head and an integral threaded shank having a flattened portion extending throughout the entire length of the shank, said shank extending through said hole, a washer-like element having an integral projection of polygonal outline adapted to snugly fit into a correspondingly shaped polygonal aperture in said face-protective element to prevent relative rotation, a hole extending through said washer-like element and projection, said hole having a contour corresponding to and slightly larger than the cross section of said shank so the latter, when projected therethrough, will prevent relative rotation between said washer-like element and shank, a spring washer also having a hole through which said shank is extended and located externally of said face protective element, and a nut having an internal screw thread into which the end portion of said shank is screwed, whereby upon tightening of said nut, said spring washer is tensioned and said face protective element is more tightly held by friction between said washer-like element and said head so as to frictionally hold said face protective element in any desired angular position relative said headband after it is raised to such position.

References Cited in the file of this patent

UNITED STATES PATENTS

| | | |
|---|---|---|
| 2,360,101 | Bowers | Oct. 10, 1944 |
| 2,718,006 | Bowers | Sept. 20, 1955 |
| 2,747,191 | Hoffmaster | May 29, 1956 |
| 2,904,790 | Ruggiero | Sept. 22, 1959 |